May 12, 1964  C. N. FLESOR ETAL  3,132,661
HIGH PRESSURE PNEUMATIC TRANSMITTER
Filed Sept. 11, 1961  3 Sheets-Sheet 1

INVENTORS
CHRIS N. FLESOR
RICHARD C. HUNTER
THEODORE S. IMSLAND
JAMES E. McEVOY
BY AND
ATTORNEY

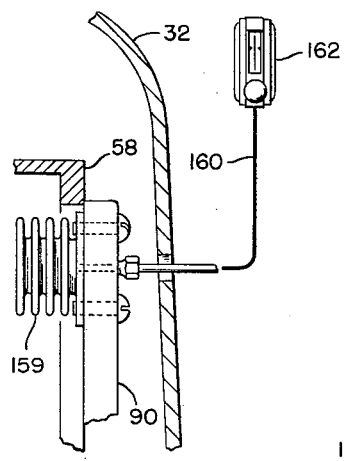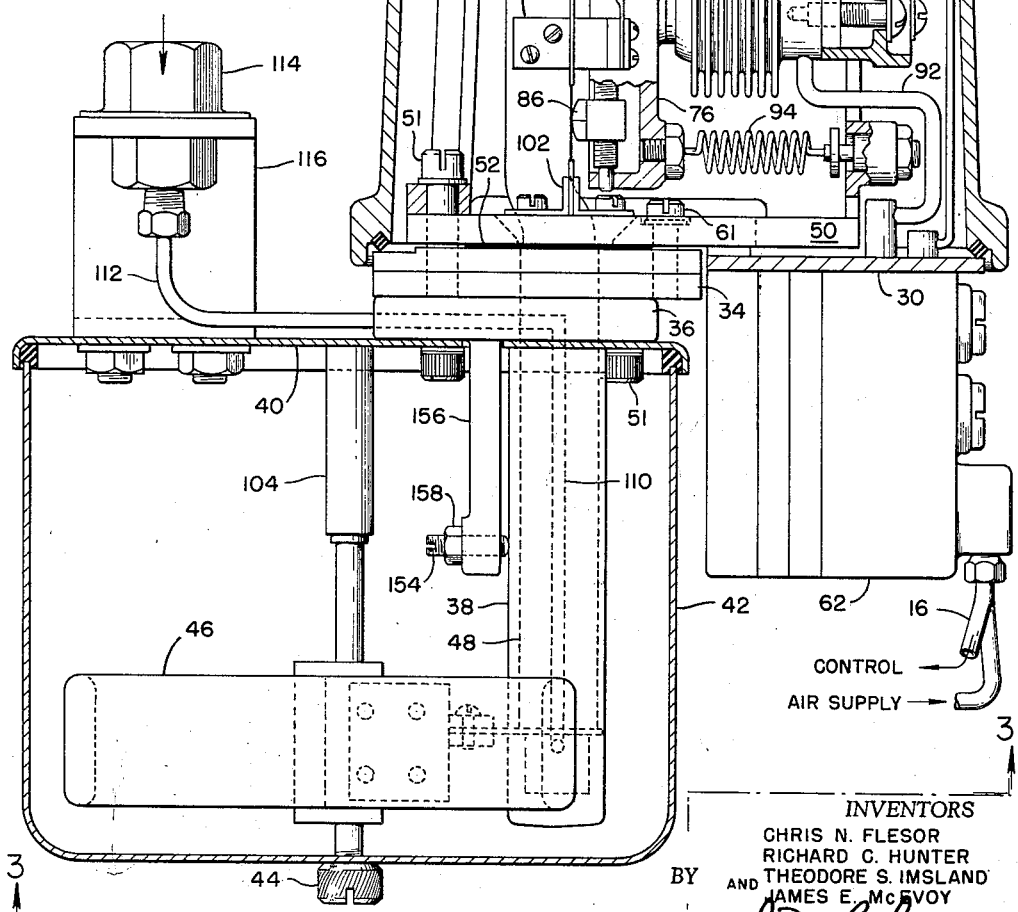

May 12, 1964 C. N. FLESOR ETAL 3,132,661
HIGH PRESSURE PNEUMATIC TRANSMITTER
Filed Sept. 11, 1961 3 Sheets-Sheet 3

INVENTORS
CHRIS N. FLESOR
RICHARD C. HUNTER
BY AND THEODORE S. IMSLAND
JAMES E. McEVOY

ATTORNEY

United States Patent Office
3,132,661
Patented May 12, 1964

3,132,661
HIGH PRESSURE PNEUMATIC TRANSMITTER
Chris N. Flesor, South Euclid, Richard C. Hunter, Willoughby, Theodore S. Imsland, Wickliffe, and James E. McEvoy, South Euclid, Ohio, assignors to Bailey Meter Company, a corporation of Delaware
Filed Sept. 11, 1961, Ser. No. 137,415
7 Claims. (Cl. 137—85)

This invention relates to pressure sensitive devices and more particularly to a transmitter for measuring and manifesting pressures of substantial magnitude.

Pneumatic transmitters are currently available which establish pneumatic signals in response to variations in a pressure condition. As is well known to those skilled in the art such transmitters usually employ a force balance or motion balance mechanism actuated by a pressure sensitive element subjected to the pressure condition. In addition pressure indicating gages are available wherein a mechanical movement in response to a variation in a pressure condition is produced.

Several types of pressure sensitive elements have been employed in pneumatic transmitters and pressure gages. Bellows and diaphragms have been extensively used in connection with both motion balance and force balance mechanisms and with indicating gages. For the most part, however, the bellows and diaphragm pressure sensitive elements are not suitable for the measurement of extremely high pressures and their use in high pressure measuring and transmitting instruments has been limited.

Another well known pressure sensitive element is the Bourdon tube. As is well known to those skilled in the art the Bourdon tube has been used extensively as a motion producing device in indicating gages and motion balance systems because it can to some extent withstand higher pressures than the bellows or diaphragm sensing devices.

The Bourdon tube motion balance transmitter while capable of measuring high pressure conditions is subject to several limitations which in many applications render it inadequate. The most important limitation is the hysteresis inherent in any motion producing device and particularly inherent in the Bourdon tube motion balance system. In many instances the accuracy of the transmitter is substantially affected by hysteresis effects reducing the utility of the transmitter.

Another major limitation of the Bourdon tube motion balance system is the difficulty in adequately suppressing operation of the transmitter to a narrow range of pressures to obtain full range variation of the transmitter output over a small range of pressure variations. Springs and other biasing devices have been employed for this purpose, but due to the difficulty of obtaining adequate motion of the biasing device coupled with non-linearity and hysteresis effects, suppression has been achieved only at the expense of accuracy.

The principal object of this invention is to provide an improved high pressure transmitter which is not subject to hysteresis effects and which can be suppressed to a narrow range of pressures without sacrificing accuracy or utility. In general this has been accomplished by utilizing the Bourdon tube as a force producing device instead of a motion producing device. We preferably use the Bourdon tube in a novel manner to actuate a force balance mechanism to produce a pneumatic transmitter capable of being suppressed to a narrow range of operation and not subject to adverse effects of hysteresis and non-linear operation. With this arrangement the Bourdon tube is maintained in a predetermined position from which it is displaced in response to a change in the measured pressure condition only until the forces balance.

Another object of the invention is to employ in combination with a Bourdon tube and force balance mechanism a pneumatic reset amplifier which reduces to a minimum the displacement required of the Bourdon tube and force balance beam in response to a pressure variation to substantially increase the sensitivity of the transmitter and speed of response thereof. The small Bourdon tube displacement required with the reset amplifier renders the transmitter particularly useful in the measurement of extremely high pressure conditions at which the stress endured by the Bourdon tube with a conventional force balance beam movement would cause fatigue failure in a short time. With the sensitivity of the reset amplifier the Bourdon tube undergoes substantially zero tip movement and is less subject to fatigue failure or elastic deformation.

Another object of the invention is to limit movement of a force balance beam to a predetermined plane.

Another object of the invention is to provide a flexible force transmitting connection between a force balance beam and the movable end of a Bourdon tube pressure sensitive element.

Another object of the invention is to remotely suppress the range of a pneumatic transmitter.

Another object of the invention is to limit the range of movement of a force balance beam and Bourdon tube pressure sensitive element during excessive or abnormal conditions.

Other objects and advantages will become apparent from the following description taken in connection with the accompanying drawings wherein:

FIG. 2 is a sectional view of the transmitter illustrated in FIG. 1;

FIG. 5 is a fragmentary sectional view illustrating a modification of the invention.

Figure 1:
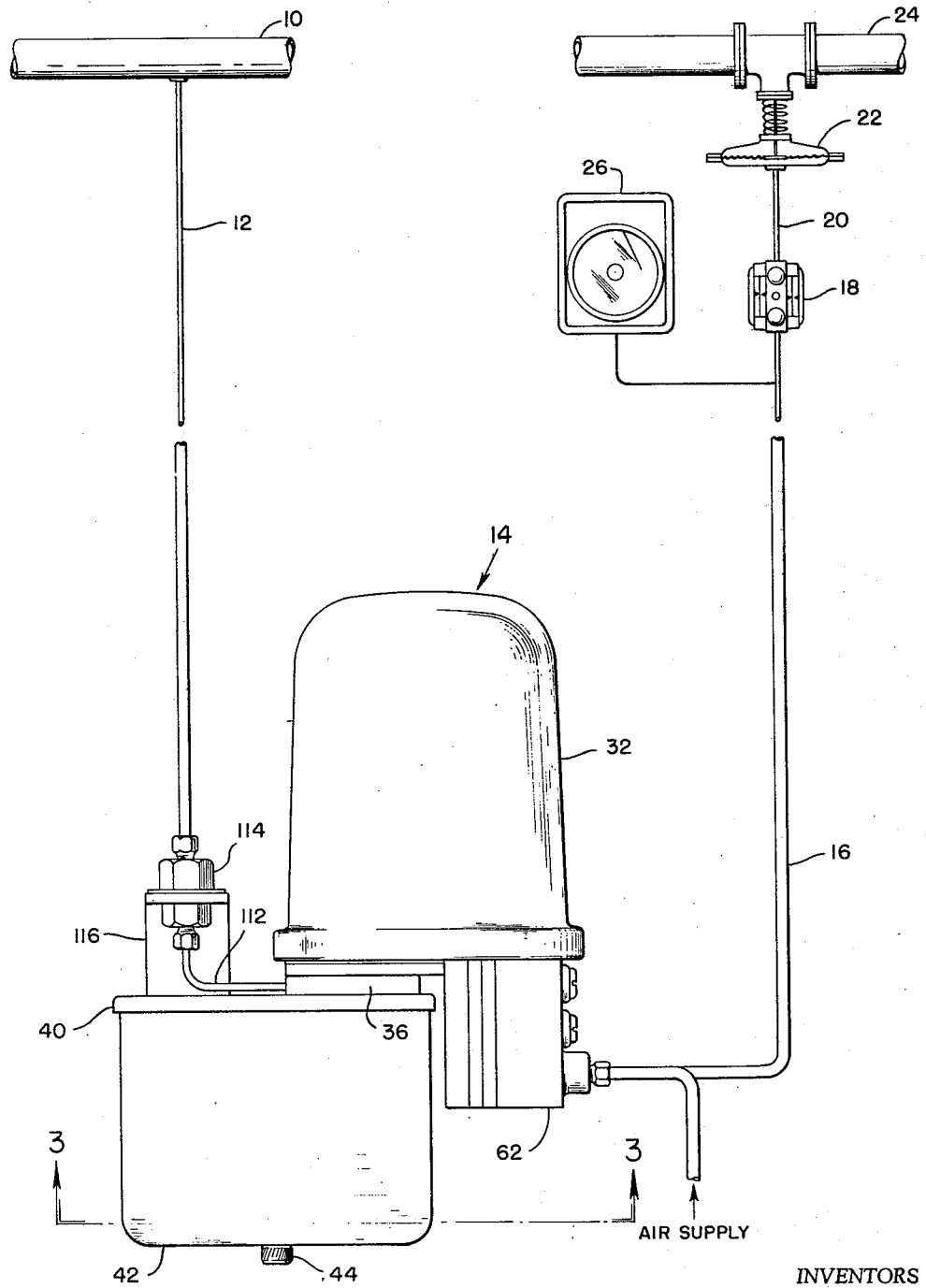
FIG. 1 is a schematic illustration of a control system employing a pneumatic transmitter embodying this invention.

Referring to FIG. 1 of the drawings, there is shown a conduit 10 containing a fluid under pressure. The pressure in conduit 10 is transmitted by a suitable pipe 12 to a pneumatic transmitting device 14 constructed in accordance with the teachings of the present invention. The transmitting device 14 functions in response to the pressure in pipe 12 to establish a proportional pneumatic signal pressure in pipe 16 which may be variously utilized. In FIG. 1 the pipe 16 is illustrated as connected to a manual-automatic selector station 18 in which the signal pressure is compared with a set point signal to establish a difference or error signal. The output of selector station 18 is applied by pipe 20 to a pneumatically operative valve 22 which controls the flow of fluid in conduit 24. A recording instrument 26 is responsive to the signal pressure in pipe 16 to provide a continuous record of the fluid pressure in conduit 10.

It will be apparent to those skilled in the art that the particular control components illustrated in FIG. 1 in combination with the transmitting device 14 form no part of the present invention and have been illustrated only for purposes of showing a typical application of the invention. Furthermore, the various components including the recording instrument 26, selector station 18 and valve 22 may take various forms well known to those skilled in the art.

Referring now to FIG. 2 of the drawings, which illustrates the structure of the transmitting device 14, there is shown a main supporting base plate 30 having an upper cover 32 attached thereto by screws (not shown). A second plate 34 is fixed to the lower side of base plate 30 to provide a rigid support for the base flange 36 of a downwardly extending support post 38 and a supporting plate 40 for a second cover 42. The cover 42 is attached to plate 40 by an elongated screw 44 and encloses a pressure sensitive element 46 the interior of which is subjected to the pressure in pipe 12. As will later be described in more detail the pressure sensitive element 46 comprises a Bourdon tube which as shown more clearly in FIG. 3 has one end thereof fixed to the post 38 and the other end thereof operatively connected to one end of a force balance beam 48.

The force balance beam 48 is similar in construction to the beam described in copending application Serial No. 759,946, filed on Sept. 9, 1958 by Jonathan B. Fleming et al., now Patent No. 3,008,480, and extends longitudinally through aligned bores provided in the base flange 36 and plates 30 and 34. A supporting plate 50 is seated on the upper surface of the plate 30 and is provided with a suitable counter-bored opening continuous with the bores in flange 36 and plates 30 and 34. Bolts 51 extend through the assembly of plates 50, 30, 34 and flange 36 to clamp the same together to establish a rigid casing structure.

A thin metal diaphragm 52 is clamped between the plates 50 and 30 to provide a pivotal support for the force balance beam 48. In general, the force balance beam 48 comprises upper and lower portions extending on opposite sides of the diaphragm 52 and threaded together clamping the diaphragm 52. With this arrangement, the force balance beam 48 is supported by the diaphragm 52 which will flex to permit pivotal movement of the force balance beam 48. Thus, upon deflection of the movable end of Bourdon tube 46 a force will be applied to the lower end of the force balance beam 48 tending to cause pivotal movement thereof on the diaphragm 52.

The upper end of the force balance beam 48 extends into the interior of a hollow mechanism supporting frame 54 clamped to the upper side of the plate 50 as illustrated most clearly in FIG. 2 and as illustrated in detail in copending application Serial No. 759,946. In general, the frame 54 comprises a pair of vertical supporting walls 56 and 58 and an upper end wall 60. The bottom portion of the mechanism frame is provided with suitable spaced flanges by means of which the frame is securely clamped to the plate 50 and associated assembly.

The upper end of the force balance beam 48 is operative upon pivotal movement of said beam to vary the output of a nozzle baffle fluid pressure couple which is effective to control the output signal pressure of a pneumatic amplifier 62 mounted on the underside of plate 30. More particularly, a flexible baffle 64 is mounted at one end on the beam 48 above the diaphragm 52 by means of a bracket 66 and has the other end thereof positioned in close proximity to the discharge end of a nozzle 68 the latter being rigidly mounted on a bracket 70 which in turn is fixed to and extends from the supporting wall 60. The nozzle 68, by a pipe 72, receives a suitable source of fluid pressure within the amplifier 62 and is also in communication with an expansible chamber (not shown) within the amplifier 62. Upon pivotal movement of the force balance beam 48 in response to deflection of the movable end of Bourdon tube 46, the baffle 64 will be deflected relative to the end of nozzle 68 to vary the pressure within pipe 72 and the expansible chamber (not shown) within pneumatic amplifier 62. The amplifier 62 is sensitive to this variation in pressure in pipe 72 to establish a corresponding amplified output signal pressure in pipe 16. The amplified output pressure as will be hereinafter described in more detail is also applied to an expansible element which produces a restoring force on the force balance beam 48.

The amplifier 62 is preferably of the reset type such as that disclosed and claimed in copending application Serial No. 652,477, filed on April 12, 1957 by Bruce H. Baldridge, now Patent No. 2,974,674, and reference is made to said patent for a complete description of the structure and operation of such a pneumatic amplifying device.

The magnitude of the output control signal in pipe 16 is determined by the magnitude of the restoring force necessary to restore the beam 48 to its original position following a deflection. To apply the restoring force, a restoring beam 76 is positioned in parallel relationship to the force balance beam 48. One end of the restoring beam 76 is pivotally mounted on the end wall 60 of frame 54 by means of hinge spring 78, while the other end thereof terminates adjacent the upper surface of the supporting plate 50.

The restoring beam 76 is generally channel shaped having an open sidewall adjacent to the force balance beam 48. A threaded shaft 80 extends longitudinally through the channel shaped structure and has its opposite ends rotatably mounted in suitable openings in the end walls of the restoring beam 76. A bushing 82 provided in the upper end wall inhibits axial movement of the shaft 80. The upper end of shaft 80 is slotted at 84 to facilitate rotation thereof.

An adjustable fulcrum 86 is threaded on the shaft 80 for movement axially of the shaft upon rotation thereof. The fulcrum 86 engages the force balance beam 48 to apply a restoring force thereto upon application of a force to the restoring beam 76. Rotation of the shaft 80 serves to adjust the point of application of this restoring force and the range of the output pressure signal in pipe 16. The particular mounting of the threaded shaft 80 and fulcrum 86 provide a highly efficient micrometer adjustment which reduces friction between the parts to a minimum during a range adjustment to thus reduce the tendency for frictional wear.

A variable force is applied to the restoring beam 76 by means of an expansible bellows 88 which is mounted at one end on a plate 90 secured to the supporting wall 58 by screws as illustrated in detail in copending application Serial No. 759,946. The movable end of bellows 88 engages the restoring beam 76 at a point intermediate its ends as illustrated in FIG. 2. The interior of the bellows 88 receives the output pneumatic signal pressure of amplifier 62 through pipe 92 to thereby apply a force to restoring beam 76 proportional to the output signal pressure. This force is accordingly transmitted through fulcrum 86 to force balance beam 48.

A calibrating spring 94 is adjustably mounted between the supporting wall 58 and the lower end of restoring beam 76 and provided with tension or compression adjustability to permit adjustment of the magnitude of the measured pressure at which the minimum output signal pressure in pipe 16 will occur. Most modern pneumatic control systems operate in a 3–15 p.s.i. or 3–27 p.s.i. signal range. Therefore, for most applications the spring 94 is adjusted to produce a 3 p.s.i. output control signal at the lower end of the measured pressure range.

As hereinbefore discussed, the transmitting device 14 is particularly adapted for the measurement of extremely high pressures. To accomplish this means are provided for biasing the force balance beam 48 to suppress the output signal pressure range. This means comprises a suppression spring 96 mounted between supporting plate 90 and a U-shaped bracket 98 fixed to force balance beam 48. With this arrangement the spring 96 applies a suppressive force directly to the force balance beam 48 which counteracts the force applied to the force balance beam 48 by the Bourdon tube 46. Through adjustment of the compressive force of spring 96 or the substitution of springs of different size the degree of suppression can be varied until the desired amount is obtained for a particular application.

To restrict movement of the force balance beam 48 to a predetermined plane, a pair of flexure strips 100 similar to those disclosed and claimed in copending application Serial No. 759,946 are positioned on opposite sides of the beam 48 in parallel relationship therewith. The upper ends of the flexure strips 100 are clamped between complemental flanges of the bracket 98 while the lower ends thereof are fixed to supporting plate 50 by clamps 102. As described in more detail in copending application Serial No. 759,946 the flexure strips 100 serve to inhibit axial movement of the force balance beam 48 and may be provided with a slight inherent bias to insure engagement of the force balance beam with the adjustable fulcrum 86.

The flexure strips 100 positioned as described above define a plane substantially perpendicular to the desired direction of pivotal movement of the force balance beam 48 toward or away from the nozzle 68 and uniquely serve to restrict motion of the beam 48 to a plane parallel to the plane defined by the nozzle 68 and baffle 64. Since the direction of the Bourdon tube force may vary slightly during deflection thereof or with different tubes the flexure strips 100 provide a desirable result.

To calibrate the transmitting device 14 to measure a high pressure condition variable in a predetermined range, the suppressive force of spring 96 is adjusted in compression to apply a suppressive force directly to the force balance beam 48 substantially equal to the force exerted by the Bourdon tube 46 at the minimum pressure condition or when the pressure is at the lower end of the range of variation. With such suppression the range of the transmitting device 14 can be adjusted by means of rotation of threaded shaft 80 to provide full range variation of the output signal pressure for the range of variation of the measured pressure condition. Spring 94 is also adjusted to accurately adjust the minimum output signal pressure.

Figure 4:
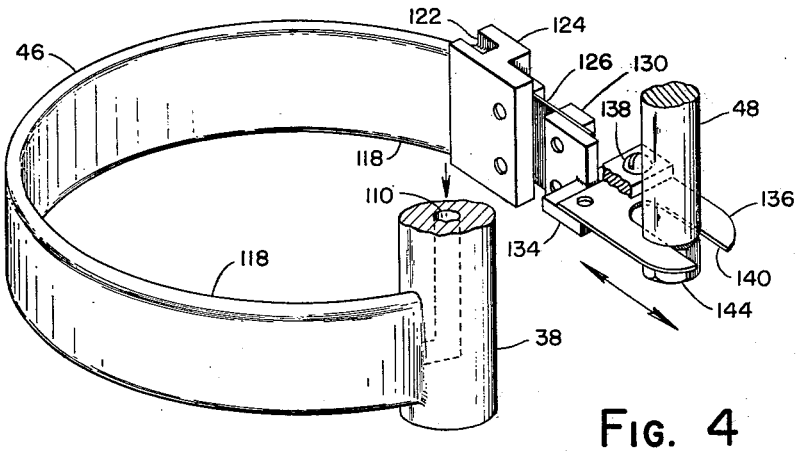
FIG. 4 is a perspective view of the Bourdon tube pressure sensitive element and several associated parts.
Figure 3:
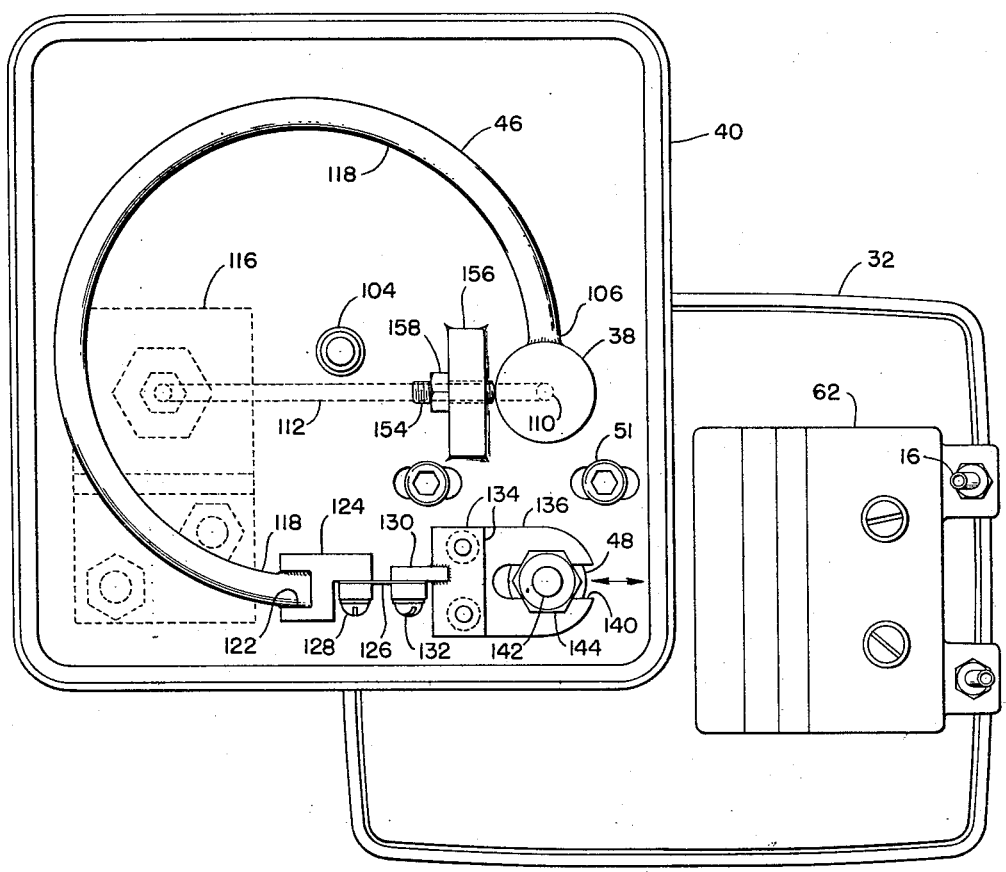
FIG. 3 is a view taken along the line 3—3 of FIG. 1 with the cover removed.

Referring now to the specific structure of the pressure sensitive element 46 and mounting therefor, which is shown most clearly in FIGS. 2, 3 and 4, this assembly is entirely enclosed by cover 42. More particularly, an internally threaded tubular extension 104 depends from the plate 40 to receive the threaded end of cover screw 44 extending through the bottom wall of the cover 34. By means of screw 44 the cover 34 is securely attached to the cover supporting plate 40 but may be easily removed for servicing or adjustment of the pressure sensitive element and associated parts.

The Bourdon tube 46 is positioned in the lowermost region of cover 42 and is substantially coiled about the longitudinal axis of the screw 44 defining a plane substantially perpendicular to both the axis of the screw 44 and the longitudinal axis of the force balance beam 48. The Bourdon tube 46 is provided with a fixed end 106 which is secured to the surface of post 38. The interior of Bourdon tube 40 communicates with a suitable drilled port 110 extending longitudinally through the interior of the supporting post 38 and then radially to the peripheral surface of base 36 to communicate with a pipe 112 extending to a suitable fitting 114 supported on the casing 30 by a bracket 116. As shown in FIG. 1, fitting 114 receives the end of pipe 12 to thus subject the interior of the Bourdon tube 46 to the pressure within conduit 10.

The movable end 118 of the Bourdon tube 46 is connected to the lower end of force balance beam 48 by a novel cross hinge assembly. More particularly, the end 118 of the Bourdon tube 46 is received by a slot 122 of a hinge spring support 124 and welded thereto to seal the interior of the Bourdon tube and rigidly secure the support 124 to the movable end 118. A hinge spring 126 has one end clamped between complemental flanges formed on the end of support 124 by means of screws 128 and the other end thereof clamped between complemental flanges of a second hinge spring support 130 by screw 132. The hinge spring 126 as shown most clearly in FIG. 3 is positioned in a plane having a substantially coplanar relationship with the major diameter plane of the end most portion of Bourdon tube 46 to permit vertical deflection as viewed in FIG. 3 of the movable end 118 and support 124 relative to support 130 about an axis parallel to the longitudinal axis of force balance beam 48.

A projecting edge of the support 130 is welded within a complemental notch formed in the projecting edge of a third hinge spring support 134 similar in construction to support 130 but having a perpendicular relationship therewith. A second hinge spring 136 is clamped between complemental flanges of the support 134 by screws 138 and provided with an elongated slot 140 in which is received an externally threaded reduced diameter end 142 of force balance beam 48. To complete the cross hinge assembly a nut 144 is threaded on end 142 to clamp hinge spring 136 to the lower end of force balance beam 48. Slot 140 permits adjustment of the position of movable end 118 relative to force balance beam 48 to facilitate calibration of the transmitting device.

Hinge spring 136 is positioned in a plane perpendicular to the palne of hinge spring 126 and thus permits deflection of the movable Bourdon tube end 118 relative to force balance beam 48 about an axis perpendicular to the longitudinal axis of beam 48. With this arrangement hinge spring 126 permits vertical deflection of Bourdon tube end 118 as viewed in FIG. 3 and hinge spring 136 permits relative deflection in a perpendicular direction to provide a self aligning flexible connection to insure application of the Bourdon tube force to the force balance beam 48 in the direction of movement thereof determined by flexure strips 100.

Means are provided for limiting movement of the force balance beam 48 to prevent deformation of the Bourdon tube 46, hinge springs 78, 126, 136 and diaphragm 52 during abnormal conditions such as removal of pressure from Bourdon tube 46 or during failure of one of the components and to insure minimum deflection of the force balance beam 48 during normal operation thereof to minimize the stress produced in the walls of Bourdon tube 48. This means includes a stop screw 150 threaded in the wall 56 of frame 54 opposite from the bracket 98 and provided with a locknut 152. The beam 48 is engageable with screw 150 during counter clockwise pivotal movement thereof at one end of the permissible and necessary range of movement. To limit clockwise pivotal movement of the beam 48 a second stop screw 154 is threaded through a support arm 156 adjacent the lower end of force balance beam 48. Screw 154 is similarly provided with a locknut 158 which is engaged by the force balance beam 48 at the other end of its permissible range of movement. During calibration screws 150 and 154 are adjusted to establish the desired range of movement of force balance beam 48.

In operation of the transmitting device 14, upon an increase in pressure in conduit 10, the Bourdon tube 46 will tend to uncoil applying an increased force to the lower end of force balance beam 48. As a result the force balance beam will pivot slightly in a clockwise direction as viewed in FIG. 2 to move the baffle 64 closer to nozzle 68. In response the nozzle 68 pressure will increase causing operation of reset amplifier 62 to increase the signal pressure in pipe 16 and pipe 92. As the signal pressure increases in magnitude the restoring bellows 88 will apply an increased force to restoring beam 76 which is supplied to force balance beam 48 at the point of contact of fulcrum 86. The output signal pressure of amplifier 62 will continue to increase until the force balance beam 48 is restored to its original position and equilibrium is established. When the original spacing between the baffle 64 and nozzle 68 is thus restored the amplifier 62 will stabilize at the higher output signal pressure condition. If a decrease in pressure in conduit 10 occurs a similar opposite sequence of operation will occur with the amplifier 62 stabilizing at a lower output signal pressure condition.

During measurement of a high pressure condition in a narrow range spring 96 is adjusted to substantially balance the Bourdon tube force at the lower end of the pressure range and range adjustment is achieved by rotation of shaft 80 as previously described.

As previously mentioned an important feature of the invention particularly during the measurement of extremely high pressure conditions is the use of the reset amplifier 62 in combination with the force balance mechanism and Bourdon tube 46. With the high sensitivity provided by the reset action of amplifier 62 only a very small movement of force balance beam 48 is required to achieve response of the amplifier 62. Accordingly, only a very slight Bourdon tube displacement is required increasing the life of the Bourdon tube substantially due to the elimination of the increased stress variations which would accompany a larger tube movement. At high pressure conditions this is extremely important since a large Bourdon tube movement can result in combined tensile and compressive stresses in the tube walls which exceed the elastic limits of the tube material. Thus, through the use of a reset amplifier in combination with a Bourdon tube sensing element we have eliminated the disadvantages of transmitters employing diaphragm and bellows sensing elements and at the same time made the Bourdon tube applicable to a force balance mechanism as a force producing device in the measurement of extremely high pressure conditions.

Another feature of the invention is the use of the flexure strips 100 to control the direction of movement of force balance beam 48 while at the same time to inhibit axial movement thereof. This structure in combination with the adjustable stop screws 154 and 152 contribute also to limit movement of the Bourdon tube 46 and provide a safety feature during abnormal operation of the transmitting device 14 causing excessive movement of the parts.

Referring now to FIG. 5 of the drawings, a modification of the invention is shown for providing adjustable suppression of the transmitting device 14 at a remote location. More particularly, a bellows 159 is mounted between plate 90 and bracket 93 in place of the suppression spring 96 illustrated in FIG. 2. A pneumatic pressure signal is transmitted to the bellows 159 by a pipe 160 from a remotely located transmitter 162 which may be manually adjusted to establish a loading pressure for bellows 159 to adjust the suppressive force applied by the bellows 159 to the force balance beam 148. Such manually adjustable transmitting devices are well known to those skilled in the art and a detailed disclosure is deemed unnecessary. It will also be apparent that the loading pressure for bellows 159 may be derived automatically to establish a loading pressure and a suppression proportional to a variable condition.

It will be apparent to those skilled in the art that many changes may be made in the construction and arrangement of parts without departing from the scope of the invention as defined in the appended claims.

It is claimed and desired to secure by Letters Patent of the United States:

1. A transmitting device comprising, a casing, a force balance beam pivotally mounted on said casing and defining a longitudinal axis, a Bourdon tube responsive to a pressure condition mounted adjacent one end of said force balance beam and at least partially coiled to define a plane perpendicular to said longitudinal axis of said force balance beam, a pair of hinge springs having perpendicular planes connected in series between said one end of said force balance beam and one end of said Bourdon tube for transmitting force from said Bourdon tube to said force balance beam, means responsive to displacement of said beam under the influence of said Bourdon tube for establishing an output signal, and means responsive to said output signal for applying a balancing force to said force balance beam.

2. A transmitting device as claimed in claim 1 wherein said displacement responsive means comprises a fluid pressure couple and a pneumatic amplifier having reset action responsive to the couple output pressure to establish an amplified output signal pressure.

3. A transmitting device comprising, a casing, a force balance beam pivotally mounted on said casing, a Bourdon tube responsive to a pressure condition mounted on said casing adjacent one end of said force balance beam, a pair of hinge springs positioned in perpendicular planes connecting the free end of said Bourdon tube to said one end of said force balance beam to apply a displacing force to said force balance beam, means responsive to displacement of said beam under the influence of said Bourdon tube for establishing an output signal, and means responsive to said output signal for applying a restoring force to said beam.

4. A transmitting device as claimed in claim 3 including means for applying a biasing force to said force balance beam to suppress the range of said output signal.

5. A transmitting device as claimed in claim 4 wherein said means for applying a biasing force is a spring operatively connected to said force balance beam.

6. A transmitting device as claimed in claim 4 wherein said means for applying a biasing force is a pressure sensitive element operatively connected to the force balance beam and including means for supplying a pressure signal to said pressure sensitive element.

7. A transmitting device as claimed in claim 6 including means for varying the pressure signal supplied said pressure sensitive element to vary the biasing force thereof and thereby vary the degree of suppression.

References Cited in the file of this patent

UNITED STATES PATENTS

| | | |
|---|---|---|
| 1,701,735 | Thomson | Feb. 12, 1929 |
| 2,224,709 | Vehling | Dec. 10, 1940 |
| 2,667,886 | Brewster | Feb. 2, 1954 |
| 2,677,385 | Markson | May 4, 1954 |
| 2,806,480 | Bowditch | Sept. 17, 1957 |
| 2,816,562 | Dryson | Dec. 17, 1957 |
| 2,851,048 | Hutchinson | Sept. 9, 1958 |
| 2,964,924 | Dodge | Dec. 20, 1960 |
| 2,986,151 | Shannon | May 30, 1961 |
| 2,999,508 | Du Bois | Sept. 12, 1961 |
| 3,008,480 | Fleming et al. | Nov. 14, 1961 |
| 3,020,490 | Kleiss | Feb. 6, 1962 |